UNITED STATES PATENT OFFICE.

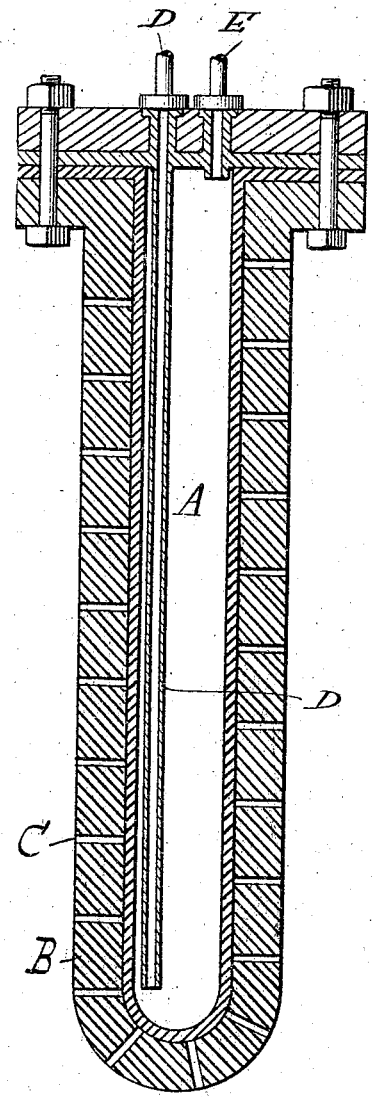

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

APPARATUS FOR WORKING WITH HYDROGEN UNDER PRESSURE.

1,188,530.   Specification of Letters Patent.   Patented June 27, 1916.

Application filed February 5, 1912.   Serial No. 675,618.

*To all whom it may concern:*

Be it known that I, CARL BOSCH, subject of the King of Prussia, residing at Ludwigshafen-on-the-Rhine, Germany, have invented new and useful Improvements in Apparatus for Working with Hydrogen Under Pressure, of which the following is a specification.

When working with hydrogen at raised temperature and under pressure in iron vessels, if the iron contains carbon the strength of the vessel suffers to such an extent that after a very short time it is no longer able to withstand the high pressure which is being employed. I have discovered that this is due to the action of the hydrogen upon the carbon. The use inside such iron tube of a lining which is chemically not acted upon by hydrogen is of little value, since, when the high temperatures are employed, practically all substances are pervious to hydrogen under pressure, so that, although the quantity of hydrogen which diffuses through the walls of the tube is only minute in comparison with the total quantity of gases treated in such tube, yet in course of time this small quantity is sufficient to act on the carbon contained in the iron of the tube to such an extent as to deteriorate the resisting power of the tube.

I have found that I can work conveniently with flowing hydrogen under continuous pressure and at raised temperatures if the vessel in which the reaction is being carried out and within which the high pressure is being maintained, be surrounded by some kind of structure which is capable of supporting the inner vessel, but which itself readily allows any gas to escape which may diffuse through the walls of the inner vessel, so that it itself is not placed under pressure. This can be effected, for instance, by surrounding the inner vessel, which is provided with inlet and outlet for the gases and which may be described, for the sake of convenience, as a tube, with a series of steel rings, or a suitable network of bars, or the inner tube may be covered with a second tube which is perforated, the essential condition being that the outer tube, which is supporting the inner tube, is not impervious to the hydrogen which diffuses through the inner tube at the high temperatures and pressures employed. It is most convenient to construct the outer perforated tube network or rings or the like of steel, while the inner tube, in which the hydrogen is contained under pressure and heat, may be constructed either of steel, or it may be preferred to employ some material which does not contain carbon, such for instance as wrought iron (practically free from carbon), nickel, silver, and the like.

The apparatus made according to this invention is particularly useful in the catalytic production of ammonia from its elements under pressure.

The drawing accompanying this specification represents in vertical section one form of apparatus according to my invention. In this A represents the inner tube which serves to inclose the gas and which is constructed, for instance, of wrought iron practically free from carbon, while B represents the outer inclosing tube of steel, the said tube B being perforated with holes C, so that it itself is incapable of retaining gas under pressure.

D and E represent tubes by which the gases are led into and out of the vessel, both the inlet and the outlet being at the same end of the vessel, while the tube D is continued toward the other end of the vessel, so that a proper circulation of the gases may be insured.

Now what I claim is:—

1. Apparatus for working with flowing hydrogen under continuous pressure and at raised temperatures, comprising an inner vessel which is of itself incapable of permanently sustaining the pressure employed; means for supporting the said vessel to enable it to sustain the pressure, which means are not capable of retaining gas under pressure and means for supplying gases to and from the said vessel.

2. Apparatus for working with flowing hydrogen under continuous pressure and at raised temperatures comprising an inner vessel which is chemically resistive to the action of hydrogen, but which is incapable of itself permanently sustaining the pressure employed, means for supporting the said vessel to enable it to sustain the pressure, which means are not capable of retaining gas under pressure and means for supplying gases to and from the said vessel.

3. Apparatus for working with flowing hydrogen under continuous pressure and at raised temperatures comprising an inner vessel which is free from carbon and is chemically resistive to the action of hydrogen, but which is incapable of itself permanently sustaining the pressure employed, means for supporting the said vessel to enable it to sustain the pressure, which means are not capable of retaining gas under pressure and means for supplying gases to and from the said vessel.

4. Apparatus for working with flowing hydrogen under continuous pressure and at raised temperatures comprising a tube of wrought iron surrounded and supported by a perforated steel tube and provided with means for supplying gas to and from the said wrought iron tube.

5. Apparatus for working with flowing hydrogen under continuous pressure and at high temperatures comprising an inner vessel which is provided with inlet and outlet openings for supplying gases to and from the said vessel and which, at all parts at which it is exposed to the action of the hot hydrogen under pressure, is surrounded and supported by means which enable it to sustain the internal pressure, the said means allowing any gas which may diffuse through the said vessel to escape.

In testimony whereof I have hereunto set my hand in the presence of two subscribing witnesses.

CARL BOSCH.

Witnesses:
J. ALEC. LLOYD,
A. O. TITTMANN.